Oct. 19, 1954  A. F. MEYER  2,691,893
DIFFERENTIAL PRESSURE GAUGE
Filed April 15, 1950  3 Sheets-Sheet 1
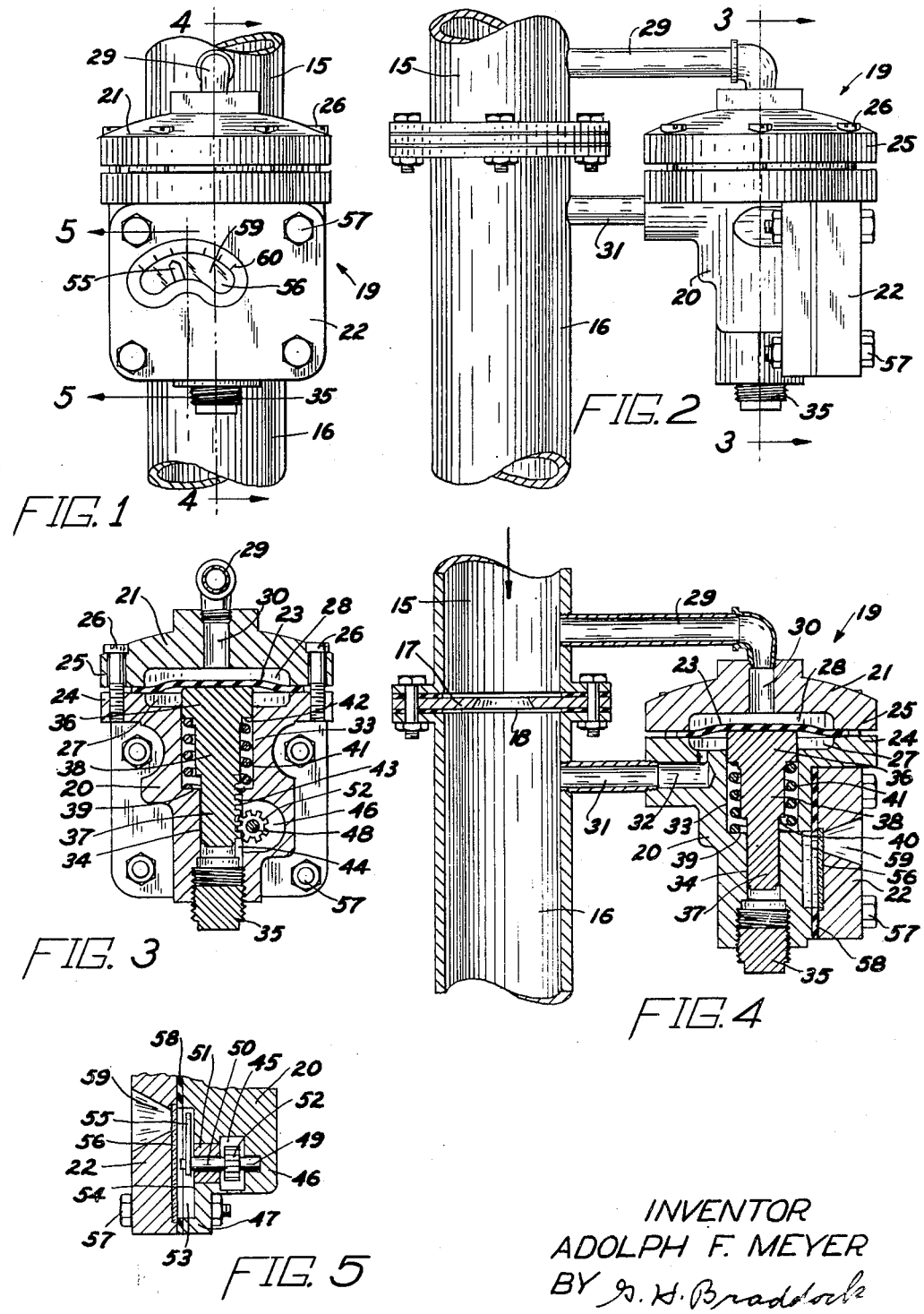
INVENTOR
ADOLPH F. MEYER
BY H. Braddock
ATTORNEY

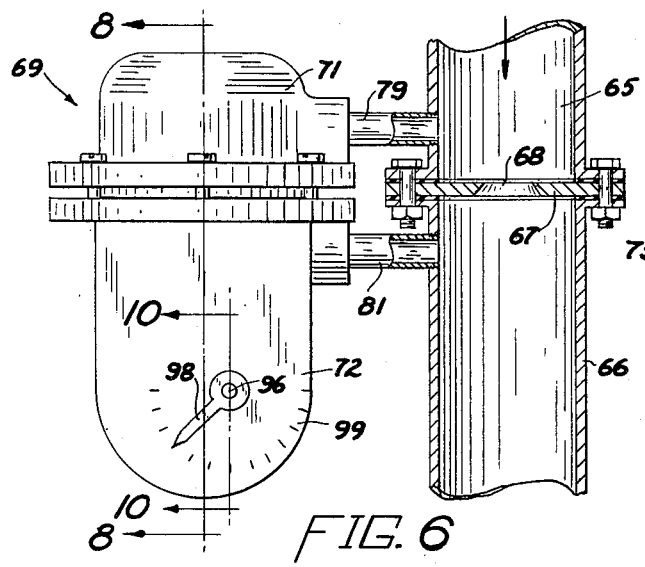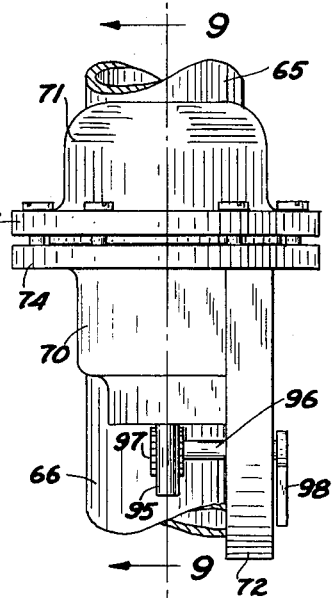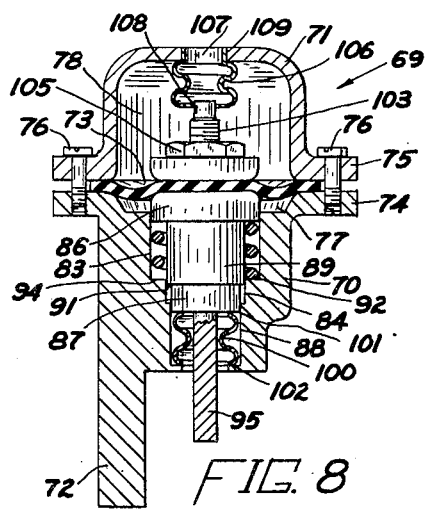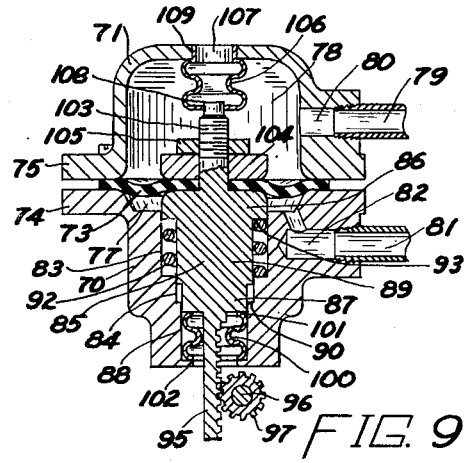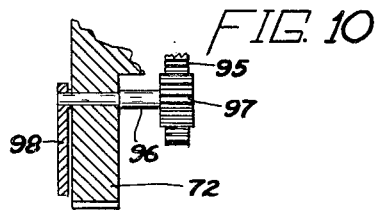
INVENTOR
ADOLPH F. MEYER
BY G. H. Braddock
ATTORNEY

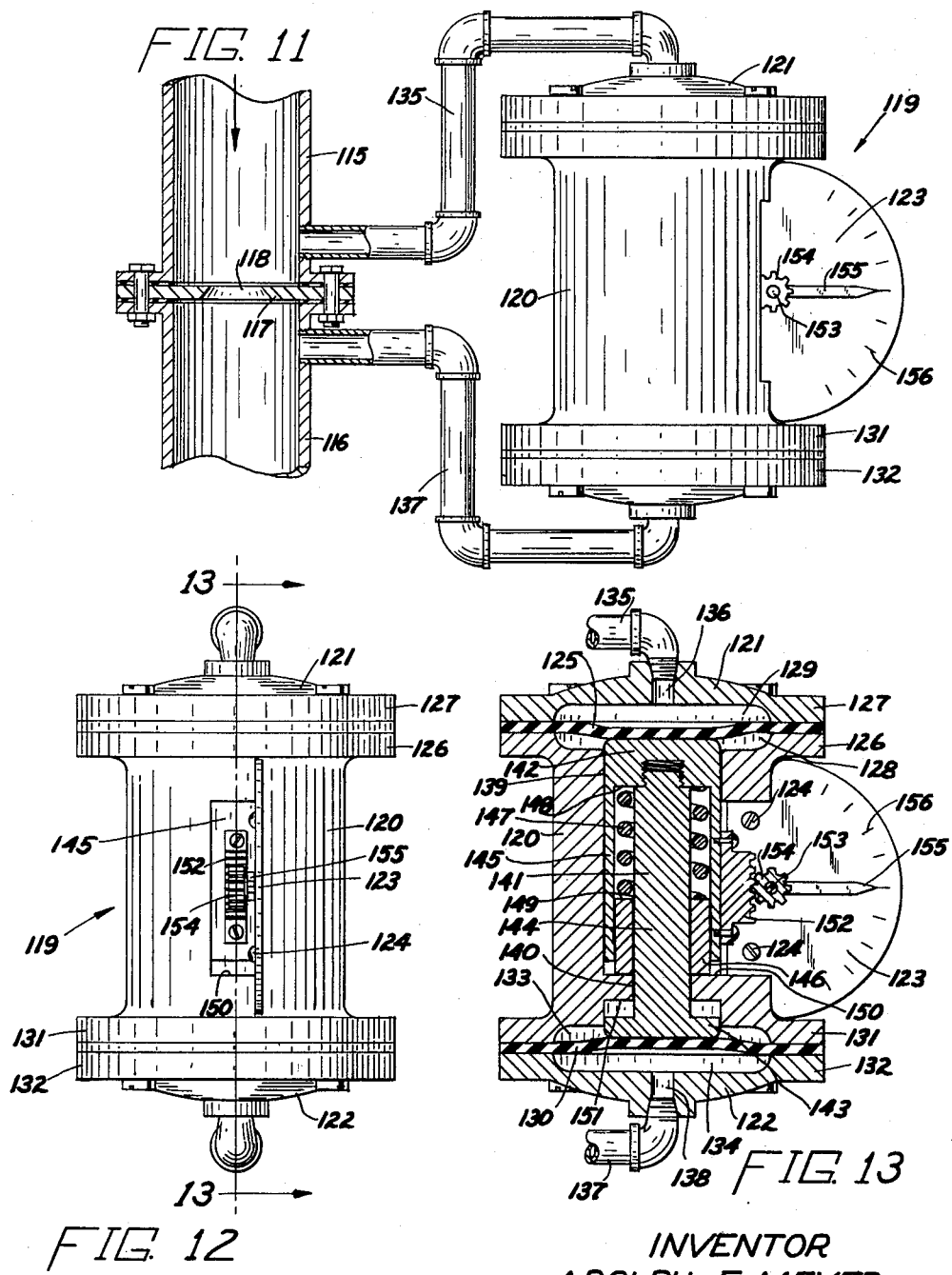

Patented Oct. 19, 1954

2,691,893

UNITED STATES PATENT OFFICE 2,691,893

DIFFERENTIAL PRESSURE GAUGE

Adolph F. Meyer, St. Paul, Minn.

Application April 15, 1950, Serial No. 156,119

1 Claim. (Cl. 73—407)

The invention herein presents a gage for indicating differential in pressure.

The purpose of the invention is to provide a new and improved gage of inexpensive construction for indicating differential in pressure which will consist of but few parts and will be operative to satisfactorily and efficiently perform its intended service or function in novel and improved manner.

In the accompanying drawings forming a part of this specification,

Fig. 1 is a front elevational view of a differential pressure gage made according to the principles of the invention;

Fig. 2 is a side elevational view of the pressure gage as it would appear from the left in Fig. 1;

Fig. 3 is a vertical sectional view, taken on line 3—3 in Fig. 2;

Fig. 4 is a vertical sectional view, taken on line 4—4 in Fig. 1;

Fig. 5 is a detail sectional view, taken on line 5—5 in Fig. 1;

Fig. 6 is a front elevational view, partially in section and partially broken away, of a differential pressure gage of modified construction made according to the invention;

Fig. 7 is a side elevational view of the pressure gage disclosed in Fig. 6 as it would appear from the left;

Fig. 8 is a vertical sectional view, taken on line 8—8 in Fig. 6;

Fig. 9 is a vertical sectional view, taken on line 9—9 in Fig. 7;

Fig. 10 is a detail sectional view, taken on line 10—10 in Fig. 6;

Fig. 11 is a front elevational view, partially in section and partially broken away, of a differential pressure gage of further modified construction incorporating features and characteristics of the invention;

Fig. 12 is a side elevational view of the pressure gage disclosed in Fig. 11 as it would appear from the right; and Fig. 13 is a vertical sectional view, taken on line 13—13 in Fig. 12.

With respect to Figs. 1 to 5 of the drawings and the numerals of reference thereon, 15 denotes an inlet connection from a source (not shown) of fluid under pressure, 16 indicates an outlet connection for the fluid, and 17 represents a flow reducing element providing an orifice 18 for restricted flow from the inlet connection 15 to the outlet connection 16.

Numeral 19 designates a differential pressure gage of a preferred type made according to the invention.

A body of the differential pressure gage 19 is constituted as a hollowed-out member 20 and a cap member 21 and a rectilinear dial plate 22 upon said hollowed-out member.

A flexible diaphragm 23, of rubber as disclosed, extending across the hollowed-out and cap members 20 and 21 in spaced relation to each, has its peripheral portion situated and clamped in fluid-tight fashion between annular flanges, denoted 24 and 25, respectively, upon said hollowed-out and cap members. As shown, the annular flanges 24 and 25 are in parallel relation and are secured to each other and in clamping relation to the flexible diaphragm by screw bolts 26.

Said flexible diaphragm, together with the hollowed-out member 20 and the cap member 21, provides a first concavity 27 at one side of said diaphragm within said hollowed-out member and a second concavity 28 at the opposite side of said diaphragm within said cap member. A first pipe connection 29 from the inlet connection 15 communicates with a port 30 in the cap member 21 which in turn communicates with the second concavity 28, and a second pipe connection 31 from the outlet connection 16 communicates with a port 32 in the hollowed-out member 20 which in turn communicates with the first concavity 27.

The first concavity 27 is contiguous, at a side thereof opposite the flexible diaphragm 23, with a first guideway 33 of relatively large diameter, or cross-sectional area, extending longitudinally of the hollowed-out member 20, an end of said first guideway 33 opposite or spaced from said first concavity 27 is contiguous with a second guideway 34 of comparatively smaller diameter, or cross-sectional area, also extending longitudinally of said hollowed-out member, and an end of said second guideway 34 opposite or spaced from the first guideway 33 is closed by a removable plug 35. The bounding walls of the first and second guideways 33 and 34 are cylindrical in the disclosure as made, and said first and second guideways are in concentric relation, as well as in alinement with the flexible diaphragm 23 in direction longitudinally of the body of the pressure gage.

An actuator plunger of the pressure gage is constituted as a head 36, at one end of said actuator plunger, snugly, slidably disposed in the end portion of the first guideway 33 adjacent the flexible diaphragm 23, a shank 37, at the end of the actuator plunger opposite the head 36, slidably disposed in the second guideway 34, and an intermediate length 38, between said head 36 and said shank 37, situated within and in spaced relation to the bounding wall of said first guideway. The intermediate length 38 has diameter greater than that of the shank 37, as well as less than that of the head 36, the overall length of said head 36 and intermediate length 38 is less than a measurement representing the distance between the flexible diaphragm 23 and an annular surface 39 in surrounding relation to the interior end of the second guideway 34 at the exterior end of the first guideway 33, or end of said first guideway opposite said flexible diaphragm and adjacent to said second guideway, and the exterior end of said intermediate length 38 provides an annular shoulder 40 adapted to become engaged with the annular surface 39 in response to movement of the actuator plunger toward said annular surface. Stated otherwise, the annular surface 39 and the annular shoulder 40 together constitute an instrumentality for limiting the extent to which the flexible diaphragm 23 can be swung in direction away from the cap member 21.

A compression coil spring 41, situated in the first guideway 33 in spaced relation to its bounding surface and in surrounding relation to the intermediate length 38 of the actuator plunger, has its exterior end engaged against an annular shoulder 42 provided by the head 36 in surrounding relation to the adjacent end of said intermediate length and its interior end engaged against the annular surface 39 thus to resiliently urge said head 36 into engaged relation with the flexible diaphragm 23, as very clearly disclosed in Figs. 3 and 4, and normally to retain the annular shoulder 40 in spaced relation to said annular surface 39, also as disclosed in said Figs. 3 and 4.

The shank 37 of the actuator plunger integrally or rigidly supports a rack 43 which is slidably guided in a longitudinal slot 44 in the hollowed-out member 20 and which longitudinal slot is contiguous with or open to a side portion of a pocket 45 within said hollowed-out member.

The pocket 45 is bounded at one of its sides, at the right in Fig. 5, by a wall 46 of the hollowed-out member 20 at one side of the rack 43, and at its opposite side, at the left in said Fig. 5, by a wall 47 of said hollowed-out member at the other side of said rack. A spindle 48, in perpendicular relation to the rack 43, has one of its end portions 49 rotatably mounted in the wall 46 and its other end portion 50 rotatably mounted in a bushing 51 fixed in the wall 47, and a pinion 52, fixed upon said spindle and situated in the pocket 45, is in mesh with said rack 43. The spindle and pinion can be inserted in the pocket 45 and assembled with the wall 46 while the bushing 51 is yet unassembled, and, after said spindle with pinion is inserted and its end portion 49 assembled, said bushing can be placed in position upon the end portion 50 and into the wall 47.

The hollowed-out member 20 includes an annular depression 53, situated partially in the wall 47 at the side thereof opposite the pinion 52, and the base of said annular depression 53 is bounded by an annular surface 54 in perpendicular relation to the spindle 48.

The end portion 50 of the spindle 48 projects into the annular depression 53 and rigidly supports an indicator arm or pointer 55 situated in said annular depression to be capable of rotating in response to rotational movement of the pinion 52 and said spindle 48.

The annular depression 53, the rectilinear dial plate 22 and a sight glass 56 cooperate to provide an annular compartment having the indicator arm or pointer 55 therein, and said dial plate is secured up against a surface, including a portion of the wall 47 as part thereof, of the hollowed-out member 20 to seal said annular compartment closed in the manner clearly disclosed in Figs. 4 and 5. More explicitly stated, the dial plate 22 is secured up against said hollowed-out member by headed and nutted bolts 57 with a flat packing or gasket 58 disposed between the hollowed-out member at one side of said packing or gasket and the sight glass and said dial plate at the other side of the packing or gasket. The packing or gasket 58 is cut away at the location of the sight glass, and said sight glass is alined with an arcuate sight opening 59 through the dial plate. The construction and arrangement will be such that the parts described preclude the possibility of passage of fluid out of the annular compartment. Said annular compartment is bounded or defined at its interior by the bounding surface of the annular depression 53 and at its exterior by the sight glass 56, and the packing or gasket 58 seals off the annular compartment about the peripheries of both said annular depression and said sight glass. The arcuate sight opening 59 is calibrated, as indicated at 60.

The manner in which the differential pressure gage is operative will be apparent. As hereinbefore stated, the compression coil spring 41 retains the head 36 of the actuator plunger up against the flexible diaphragm 23. Said flexible diaphragm will be swung toward said actuator plunger in response to increase in pressure differential in the inlet and outlet connections 15 and 16, of course against the force of said compression coil spring, to operate the actuator plunger to cause the pinion 52, together with the spindle 48 and the indicator arm or pointer 55 as a unit, to be rotated so that said indicator arm or pointer will denote a higher reading, and the compression coil spring will be operative in response to decrease in pressure differential in said inlet and outlet connections to cause said actuator plunger to swing the flexible diaphragm in direction toward the cap member 21 and rotate said pinion 52, spindle 48 and indicator arm or pointer 55 so that the indicator arm or pointer will denote a lower reading. The compression coil spring carries or supports the differential pressure. Said compression coil spring becomes elongated in response to decrease in differential pressure, thus to cause the reading to be decreased in proportion as the pressure differential is decreased, and shortened in response to increase in differential pressure, thus to cause the reading to be increased in proportion as the pressure differential is increased.

While the differential pressure gage of the invention can be employed to denote differential in pressure of any fluid, it has been found to be satisfactorily and efficiently useful when the fluid whose pressure differential to be measured is water. In a practical installation, the fitting of the parts need not be fluid-tight to such extent as to preclude passage, or eventual passage, of the water or fluid on the low pressure side into the annular compartment containing the indicator arm or pointer 55. In embodiments of the differential pressure gage now being successfully operated, all of the working parts are immersed in water which does not in any manner affect proper and efficient operation or lessen the accuracy of the readings.

Referring to Figs. 6 to 10, numeral 65 denotes an inlet connection from a source (not shown) of fluid under pressure, 66 indicates an outlet connection for the fluid, and 67 represents a flow reducing element with orifice 68 for restricted flow.

A body of the differential pressure gage 69 is constituted as a hollowed-out member 70, a cap member 71 upon said hollowed-out member, and a dial plate 72 constituted as an integral extension upon the hollowed-out member at a side thereof opposite said cap member 71.

A flexible diaphragm 73, extending across the hollowed-out and cap members 70 and 71 in spaced relation to each, has its peripheral portion situated and clamped in fluid-tight manner between annular flanges, represented 74 and 75, respectively upon said hollowed-out and cap members. The annular flanges 74 and 75 are in parallel relation and are secured to each other in clamping relation to the flexible diaphragm 73 by screw bolts 76.

The flexible diaphragm 73, the hollowed-out member 70 and the cap member 71 together provide a first concavity 77 at one side of the diaphragm within said hollowed-out member and a second concavity 78 at the opposite side of said diaphragm within said cap member. A first pipe connection 79 from the inlet connection 65 communicates with a port 80 in the cap member 71 which in turn communicates with the second concavity 78, and a second pipe connection 81 from the outlet connection 66 communicates with a port 82 in the hollowed-out member 70 which in turn communicates with the first concavity 77.

The first concavity 77 is contiguous with a first guideway 83 of relatively large diameter extending longitudinally of the hollowed-out member 70, and an end of said first guideway 83 opposite said first concavity 77 is contiguous with a second guideway 84 of comparatively smaller diameter, also extending longitudinally of said hollowed-out member. Said first and second guideways 83 and 84 are in concentric and alined relation and in alinement with the flexible diaphragm 73.

An actuator plunger 85 includes a head or first disc 86 snugly, slidably disposed in the end portion of the first guideway 83 adjacent the flexible diaphragm 73, an outer length 87, at the end of the actuator plunger opposite the head or first disc 86, slidably disposed in a third guideway 88 at the end of the second guideway 84 opposite the first guideway 83, and an intermediate length 89, between said head or first disc 86 and said outer length 87, situated within and in spaced relation to the bounding surface of said first guideway and slidably disposed in said second guideway 84. The intermediate length 89 has diameter greater than that of the outer length 87, as well as less than that of the head or first disc 86, the overall length of said head or first disc 86 and intermediate length 89 is less than a measurement representing the distance between the flexible diaphragm 73 and an annular surface 90 in surrounding relation to the interior end of the third guideway 88 at the exterior end of the second guideway 84, and the exterior end of said intermediate length 89 provides an annular shoulder 91 adapted to become engaged with the annular surface 90 in response to movement of the actuator plunger toward said annular surface 90.

A compression coil spring 92, situated in the first guideway 83 in spaced relation to its bounding surface and in surrounding relation to the intermediate length 89, has its interior end engaged against an annular shoulder 93 provided by the head or first disc 86 and its exterior end seated against an annular surface 94 in surrounding relation to the interior end of the second guideway 84, thus to resiliently urge said head or first disc 86 toward the flexible diaphragm 73 and normally to retain the annular shoulder 91 in spaced relation to the annular surface 90.

The outer length 87 of the actuator plunger 85 integrally supports a rack 95 which is alined with the remainder of said actuator plunger and extends to position outside of the hollowed-out member 70.

A spindle 96, mounted in the dial plate 72 in perpendicular relation to the rack 95, fixedly supports a pinion 97 on one of its end portions which is in mesh with said rack and an indicator arm or pointer 98 on its other end portion which is movable relative to a calibrated surface 99 of said dial plate.

Whereas the rack 43, the pinion 52 and the spindle 48 with pointer 55 of the pressure gage operating mechanism of the disclosure of Figs. 1 to 5 are situated within the hollowed-out member 20 and sealed off from atmospheric pressure, the rack 95, the pinion 97 and the spindle 96 with pointer 98 of the pressure gage operating mechanism of the disclosure of Figs. 6 to 10 are situated outside of the hollowed-out member 70 so that the actuator plunger 85 must of necessity be subjected, at its exterior end including said rack 95, to the influence of atmospheric pressure. In the disclosure as made, the low pressure side of the system, including the first concavity 77, is sealed off from atmospheric pressure by a first bellows 100, in surrounding relation to the rack 95, having its interior end 101 secured in fluid-tight manner to the adjacent end surface of the outer length 87 of said actuator plunger 85 and its exterior end 102 secured in fluid-tight manner to a portion of the internal surface bounding the exterior end of the third guideway 88, in spaced relation to said adjacent end surface of said outer length.

The actuator plunger 85 additionally integrally includes an externally threaded element 103 which extends from the side of the first disc 86 opposite the first bellows 100 and passes centrally and perpendicularly through the flexible diaphragm 73. A second disc 104, within the second concavity 78 and upon said externally threaded element 103, is clamped down against the surface of said flexible diaphragm 73 opposite the first disc 86 by a nut 105 upon the externally threaded element. The first and second discs 86 and 104 are of equal area and alined in direction perpendicularly of the flexible diaphragm 73.

A second bellows 106, open to atmosphere at 107 through a central portion of the cap member 71 alined with the actuator plunger 85 and its externally threaded element 103, has its interior end 108 secured in fluid-tight manner to and about the adjacent end portion of said externally threaded element and its exterior end portion 109 secured in fluid-tight manner to the bounding surface of the opening 107. The first and second bellows 100 and 106 are of duplicate construction.

It has been ascertained that both first and second bellows, such as 100 and 106, need be included in installations of the differential pressure gage as in Figs. 6 to 10, especially when the pressure gage is to be employed to indicate variable high pressures. Stated differently, employment of a first bellows, such as 100, necessitates the employment of a second, compensating bellows, such as 106, to the end that the net flexible diaphragm and disc area exposed to both high and low pressure will be exactly the same under all conditions. Atmospheric pressure is upon opposed surfaces of the first and second discs 86 and 104, and the first and second bellows 100 and 106 constitute instrumentalities through the medium of which atmospheric pressure upon said opposed surfaces of said first and second discs is equalized. By reason of such phenomenon, the effect of atmospheric pressure is eliminated, with the result that the device of Figs. 6 to 10 functions in the same general manner as does the device of Figs. 1 to 5. The compression coil spring 92 urges the first disc 86 of the actuator plunger 85 toward the flexible diaphragm 73. Said flexible diaphragm will be swung toward said actuator plunger in response to increase in pressure differential in the inlet and outlet connections 65 and 66 to operate the actuator plunger to cause the indicator arm or pointer 98 to denote a higher reading, the compression coil spring 92 will be operative in response to decrease in pressure differential in said inlet and outlet connections to cause said actuator plunger to move the indicator arm or pointer to denote a lower reading, and, by reason of the employment of the construction and arrangement including the first and second bellows 100 and 106 as part thereof, proper and accurate functioning of the differential pressure gage will be unaffected by atmospheric pressure.

In Figs. 11 to 13 of the drawings, 115 denotes an inlet connection from a source of fluid under pressure, 116 indicates an outlet connection for the fluid, and 117 represents a flow reducing element with orifice 118 for restricted flow.

A body of the differential pressure gage 119 consists of a hollowed-out member 120, first and second cap members, indicated 121 and 122, respectively, upon opposite ends of said hollowed-out member, and a dial plate 123 secured, as at 124, to the hollowed-out member at a side thereof and situated between said cap members 121 and 122.

A first flexible diaphragm 125, extending across the hollowed-out and first cap members 120 and 121 in spaced relation to each, has its peripheral portion situated and clamped in fluid-tight fashion between annular flanges, represented 126 and 127, respectively, upon said hollowed-out and first cap members.

The first flexible diaphragm 125, the hollowed-out member 120 and the first cap member 121 provide a first concavity 128 at one side of said first flexible diaphragm within said hollowed-out member and a second concavity 129 at the opposite side of the first flexible diaphragm within said first cap member.

A second flexible diaphragm 130, extending across the hollowed-out and second cap members 120 and 122 in spaced relation to each, has its peripheral portion situated and clamped in fluid-tight manner between annular flanges, denoted 131 and 132, respectively, upon said hollowed-out and second cap members.

The second flexible diaphragm 130, the hollowed-out member 120 and the second cap member 122 provide a third concavity 133 at one side of said second flexible diaphragm within said hollowed-out member and a fourth concavity 134 at the opposite side of the second flexible diaphragm within said second cap member.

A first pipe connection 135 from the inlet connection 115 communicates with a port 136 in the first cap member 121 which in turn communicates with the second concavity 129, and a second pipe connection 137 from the outlet connection 116 communicates with a port 138 in the second cap member 122 which in turn communicates with the fourth concavity 134.

The first concavity 128 is contiguous with a first guideway 139 at the side of said first concavity opposite the first flexible diaphragm 125, and the third concavity 133 is contiguous with a second guideway 140 at the side of the third concavity opposite the second diaphragm 130.

An actuator plunger 141 consists of first and second heads or discs, designated 142 and 143, respectively, interconnected by an elongated element 144 disposed centrally of said first and second heads or discs, and a skirt 145 integral with the first head or disc 142 and extending therefrom in direction toward the second head or disc 143, in spaced, surrounding relation to the elongated element 144.

The first head or disc 142 is slidably disposed in the first guideway 139, a portion of the elongated element 144 adjacent the second head or disc 143 is slidably disposed in the second guideway 140, and the open, exterior end portion of the skirt 145 is slidably situated upon an annular member 146 rigid with the hollowed-out member 120 and slidably containing said elongated element 144.

The area of the surface of the first flexible diaphragm 125 exposed to pressure of fluid in the second concavity 129 is equal to the area of the surface of the second flexible diaphragm 130 exposed to pressure of fluid in the fourth concavity 134, and the outer surfaces of the first and second heads or discs 142 and 143 also are of equal area. Said first flexible diaphragm 125, the actuator plunger 141 and said second flexible diaphragm 130 are in alinement, with said actuator plunger situated centrally of the first and second flexible diaphragms, and the overall length of the actuator plunger is equal to a measurement representing the distance between said first and second flexible diaphragms.

A compression coil spring 147, situated within and in spaced relation to the skirt 145 and in surrounding relation to the elongated element 144, has its interior end engaged against an interior surface 148 of the first head or disc 142 and its exterior end seated upon an interior surface 149 of the annular member 146, thus to urge said first head or disc 142 toward the first flexible diaphragm 125 and the second head or disc 143 away from the second flexible diaphragm 130.

The lower end of the skirt 145 is adapted to engage a surface 150 of the hollowed-out member 120 in response to swinging movement of the first diaphragm 125 toward the actuator plunger 141 thus to limit the extent to which said actuator plunger can travel in direction away from the second concavity 129, and the second head or disc 143 is adapted to engage a surface 151 of said hollowed-out member in response to swinging movement of the second diaphragm toward the actuator plunger thus to limit the extent to which said actuator plunger can travel away from the fourth concavity 134.

The skirt 145 of the actuator plunger 141 supports a rack 152 which is disposed at a side of said actuator plunger in parallel relation thereto and situated in a cut-away portion of the hollowed-out member 120.

A spindle 153, mounted in the dial plate 123 in perpendicular relation to the rack 152, fixedly supports a pinion 154 which is in mesh with said rack and an indicator arm or pointer 155 which is movable relative to a calibrated surface 156 of said dial plate. As disclosed, the pinion 154 and the indicator arm or pointer 155 are at the same side of the dial plate 123.

In the form of the invention as illustrated in Figs. 11 to 13, none of the operative parts, except the first and second flexible diaphragms 125 and 130, is subjected to the fluid whose pressure is being measured. As in the embodiments of the invention illustrated in Figs. 1 to 5 and Figs. 6 to 10, the compression coil spring carries the differential pressure. The stops, limiting the extent of movement of the actuator plunger 141 in either direction, are provided in order that the differential pressure gage can be subjected to either the high pressure only or the low pressure only without damage.

The compression coil spring 147 urges the first head or disc 142 toward the first flexible diaphragm 125 and the second head or disc 143 away from the second flexible diaphragm 130, as has been stated. Said first flexible diaphragm will be swung toward the actuator plunger 141 in response to increase in pressure differential in the inlet and outlet connections 115 and 116, of course against force of the compression coil spring 147, thus to cause said actuator plunger 141 to operate the indicator arm or pointer 155 to denote a higher reading, and with movement of the actuator plunger by reason of increase in pressure differential, its second head or disc 143 will accomplish swinging movement of the second flexible diaphragm 130 toward the fourth concavity 134 to the same extent the first flexible diaphragm 125 is swung away from the second concavity 129. The compression coil spring 147 will be operative in response to decrease in pressure differential in said inlet and outlet connections to cause said actuator plunger to rotate the indicator arm or pointer to denote a lower reading, and with movement of the actuator plunger by reason of decrease in pressure differential, its first head or disc 142 will accomplish swinging movement of the first flexible diaphragm 125 toward the second concavity 129 and its second head or disc 143 will permit swinging movement of the second flexible diaphragm 130 away from the fourth concavity 134 to the same extent said first flexible diaphragm is swung toward said second concavity.

Differential pressure gages made according to the disclosures of the invention as in Figs. 1 to 5 and Figs. 6 to 10 operate to accurately denote pressure differential regardless of the constancy of the high pressure. In instances when the high pressure is constant, the double diaphragm gage of Figs. 11 to 13 also operates accurately. However, a pressure gage made according to the disclosure of said Figs. 11 to 13 calibrated to indicate differential in pressure under the condition of varying high pressure in a selected range will operate with diminished accuracy when employed to indicate the differential pressure for which calibrated under the condition of varying high pressure in a considerably different range, of greater or less value, as the case may be. For example, supposing the new and improved double diaphragm gage to be calibrated to denote a differential pressure of say 50 p. s. i. under the condition of 50-100 p. s. i. high pressure, its accuracy will diminish if the gage is used for a similar differential pressure but in the range of say 100-150 p. s. i.; 200-250 p. s. i.; or 300-350 p. s. i. The diminished accuracy results from the fact that the first and second diaphragms 125 and 130 act differently when they are in the high position near one end of the travel than they do when in the low position near the other end of the travel.

What is claimed is:

A pressure gauge comprising a body member having a cavity therein, said cavity having an opening at the surface of said body member, a cap member closing said opening and having a concavity opening toward said cavity, a flexible diaphragm fluid-tightly sealing off the cavity in said body member from the concavity in said cap member, a plunger slidably mounted in said cavity and being restrained from substantial movement save for sliding toward and away from said diaphragm, said plunger having an end bearing on said diaphragm and compression means urging the plunger against said diaphragm, a rack rigid with said plunger, means in said cavity responsive to the position of said plunger and rack constituted as a spindle having a pointer and a pinion thereon, said pointer exhibiting the position of said plunger and said rack engaging said pinion, a first wall integral with said body member rotatably supporting an end portion of said spindle at a first side of said pinion, a second wall integral with the body member, said walls defining a space substantially enclosing said pinion and spindle, a bushing removably mounted in an opening in said second wall and accessible exteriorly of said body member rotatably and removably supporting an end portion of the spindle at a second side of said pinion adjacent said pointer, said pinion being so proportioned as to permit its removal through said opening in said second wall when said bushing and said spindle are removed, sight means affording a view of said pointer from outside of said body member, and a sight glass removably secured up against an external surface of said body member in covering relation to said spindle, pointer and bushing and in covering and protecting relation to said sight means, said concavity and cavity being fluid-tightly sealed off from atmosphere save for conduit means for admitting a first fluid pressure to the cavity on one side of the diaphragm and conduit means for admitting a second fluid pressure of greater magnitude than the first fluid pressure to the concavity on the other side of said diaphragm, whereby to measure the difference between said pressures free from effects of atmospheric pressure on said gauge.

References Cited in the file of this patent

UNITED STATES PATENTS

| Number | Name | Date |
|---|---|---|
| 1,296,947 | Blot-Garnier et al. | Mar. 11, 1919 |
| 1,499,384 | Lee | July 1, 1924 |
| 1,739,297 | Eynon | Dec. 10, 1929 |
| 1,870,058 | Levine | Aug. 2, 1932 |
| 1,943,993 | Stewart et al. | Jan. 16, 1934 |
| 2,052,720 | MacLean et al. | Sept. 1, 1936 |
| 2,359,168 | Somes et al. | Sept. 26, 1944 |
| 2,423,394 | Lee, 2nd | July 1, 1947 |

FOREIGN PATENTS

| Number | Country | Date |
|---|---|---|
| 375,453 | Great Britain | June 30, 1932 |